J. I. ORKIN.
GAS STOVE.
APPLICATION FILED AUG. 20, 1908.

937,951.

Patented Oct. 26, 1909.

WITNESSES:
G. H. Hosmer
Timothy Bagley

INVENTOR.
Jacob I. Orkin.
BY
Smith & Risbie
ATTORNEYS.

UNITED STATES PATENT OFFICE.

JACOB I. ORKIN, OF BOSTON, MASSACHUSETTS.

GAS-STOVE.

937,951.  Specification of Letters Patent.  Patented Oct. 26, 1909.

Application filed August 20, 1908. Serial No. 449,550.

*To all whom it may concern:*

Be it known that I, JACOB I. ORKIN, a citizen of the United States, residing at Boston, in the county of Suffolk and State of Massachusetts, have invented certain new and useful Improvements in Gas-Stoves, of which the following is a specification, reference being had therein to the accompanying drawing.

My invention relates to improvements in gas stoves, in which means are provided for heating a tank of water at the same time that the stove is being used for cooking or other purposes, thereby insuring a constant supply of hot water, as long as the burners are in operation.

The object of the invention is to provide a gas stove of simple construction, provided with a water tank and means for simultaneously supplying heat for general purposes and directly heating the water tank, and it is also an object to provide means for facilitating a circulation of water within the water tank.

Another object is to provide improved means for employing direct heat simultaneously for cooking and heating the water tank, without any portion of the tank or other structure intervening to deflect the flame and heat, thereby the heat available for cooking purposes is not reduced and consequently the efficiency of the stove for both cooking and heating purposes is entirely retained.

Another object is to provide burners having means for draining the burner-holders of any liquids that may fall into the burner-holders during the process of heating or cooking.

In previous devices of this kind for utilizing heat simultaneously for the purpose of cooking and heating water, a portion of the water tank or other structure has generally intervened to either deflect or entirely intercept the direct heat from the burners.

The invention consists in the combination of elements and in certain parts of novel construction entailed in the combination of said elements to obtain the desired result.

A full understanding of my invention can best be given by a detailed description of a preferred construction embodying the various features of my invention, and such a description will now be given in connection with the accompanying drawings, and I attain my object by the mechanism there illustrated, showing such preferred construction, and the features forming the invention will then be specifically pointed out in the claims.

Figure 2:
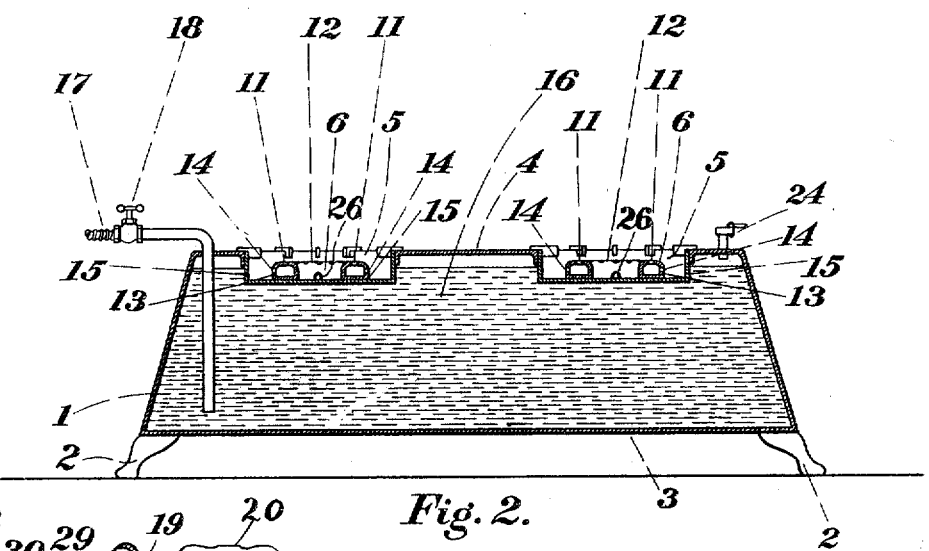
Figure 5:
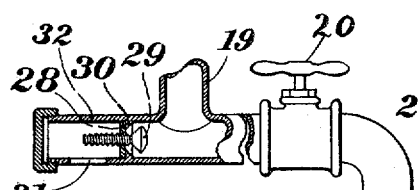
Figure 1:
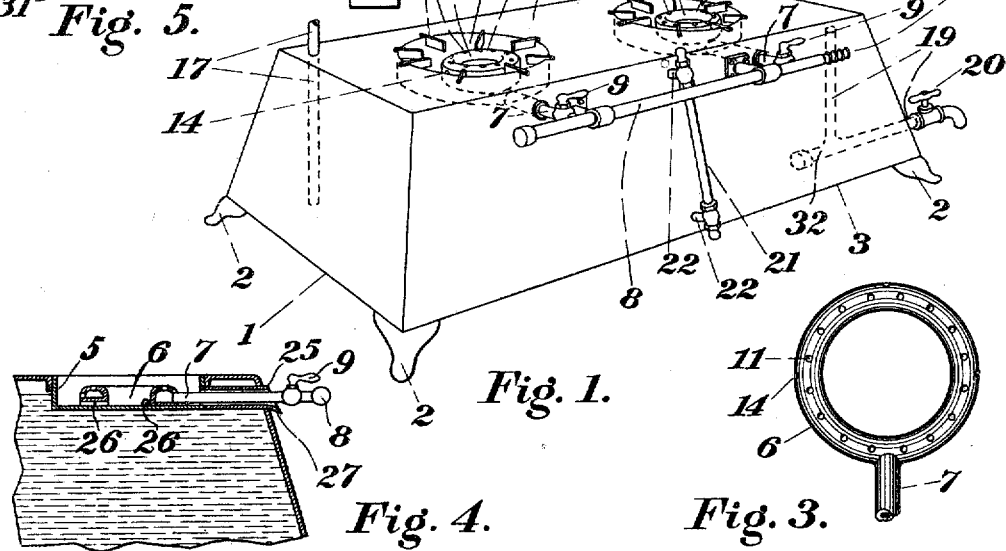
Figure 4:
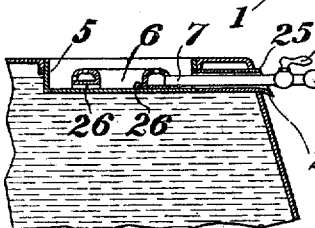
Figure 3:
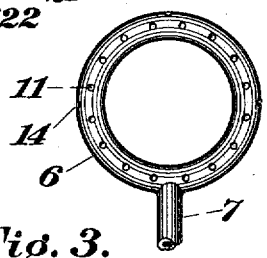
Figure 6:
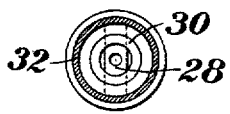

In the accompanying drawings, Figure 1 is a perspective of my improved gas stove, showing the inlet and outlet water pipes. Fig. 2 is a central vertical section of the gas stove. Fig. 3 is a plan view of one of the burners. Fig. 4 is a cross section showing a burner and burner-holder and adjoining parts. Fig. 5 is a cross section of the outlet-pipe and supplementary valve. Fig. 6 is a front sectional elevation of the valve seat with the valve removed.

Latitude is allowed herein as to details, as they may be changed or varied at will without departing from the spirit of the invention and the same yet remain intact and be protected.

In the drawings 1 is a water receptacle or tank supported by legs 2, which are attached to the base-plate 3 of the tank. The tank is provided upon its upper-plate 4 with gas burner-holders 5, which extend into the tank and are either formed in the upper-plate 4 or attached thereto by any suitable means. Gas burners 6 of the same depth as burner-holders 5 are centrally mounted within the burner-holders 5 and are provided with gas supply-pipes 7, which are connected with a main gas supply-pipe 8, attached to the front side of the tank. The gas supply-pipes 7 have lever-cocks for controlling the supply of gas admitted to the burners 6 and the supply-pipe 8 is provided with a threaded portion 10 for connecting with the gas by means of a rubber tube or otherwise. The burners 6 and burner-holders 5 may be made deeper than they are shown in the drawings and may be extended to the bottom of the water tank, if desired, in which case the position of the main gas supply-pipe 8, and the gas supply-pipes 7 with their adjacent parts would be changed accordingly.

The gas burners 6 are provided with gas-jet holes 11 upon their upper-surfaces 12, each of which, when the gas is lighted, forms a separate gas jet. On the sides 13 of the gas burners 6 are a plurality of gas-jet holes 14, each of which forms a separate gas-jet and serves to direct the gas flame against the sides 15 of the gas burner-holders 5, thereby heating the entire surface of the gas burner-holders 5, and, therefore, the entire tank, from which the heat is communicated to the water 16 in the tank, which is shown surrounding the gas burner-holders 5.

Water enters the tank through an inlet-pipe 17 provided with a cock 18 and any suitable means may be employed to connect the inlet-pipe 17 with the water supply. The inlet-pipe 17 is located in a corner of the upper-plate 4 of the tank and extends down into the tank almost to its base-plate 3. On the opposite side of the tank is an outlet-pipe 19 provided with a faucet-cock 20, through which hot water may be drawn, when desired. The outlet-pipe 19 is placed in one of the side-walls of the tank diametrically opposite to the inlet-pipe 17 and extends upward almost to the upper-plate 4.

A water gage 21, provided with pipes 22 which enter the tank, is placed on one side of the tank and serves to indicate at all times the height of the water in the tank. Cooking plates 23 on the burner-holders 5 serve to support any article placed above the burners 6. A vent-hole 24, provided with means for opening and closing the same, is located in one corner of the upper-plate 4 and is shown open in the drawings, which is necessary when the inlet-pipe cock 18 is closed, so that any steam in the tank will have a means of escape. The burners 6 are provided with a plurality of draining-grooves 26 on the under-side, for the purpose of drawing off any water or other liquid that may drop into the burner-holders 5.

A drain-pipe 25, which surrounds but is not in contact with the gas supply-pipe 7, enters and connects the burner-holders 5 with the side-wall of the tank, and serves as an outlet for water or other liquid coming from the burner-holders 5. The drain-pipe 25 has a lip 27 at its extremity to facilitate the passage of water or other liquid from the pipe 25. The draining grooves 26 serve to direct the flow, from all parts of the bottom of the burner-holders of any liquid falling therein, outward and toward the drain-pipe 25, and also aid in preventing clogging from this source of the gas burners.

The outlet-pipe 19 is provided at its base, adjoining the base-plate 3 of the tank, with an extended portion 32, which has a valve, so that the same may be opened when the water used is without pressure. In case the inlet-pipe 17 is not connected to a water supply under pressure the vent-hole 24 is left open in order to prevent an explosion by excess steam caused in heating the water, and as the water is drawn from the tank ordinarily near the top through the upper portion of pipe 19, it is necessary to provide the extended portion 32 with a valve, so as to draw the water when the level of the water is below the opening in the top of the pipe 19.

The valve has a cross-piece 28, which is located in the extended portion 32 of pipe 19, between an opening 31 in the extended portion 32 and pipe 19. The opening 31 permits the water to pass from the water tank into the extended portion 32, through the valve and hence through the faucet-cock 20. Adjoining the cross-piece 28 is a valve-seat 30, which is provided with a central, tapered opening. The cross-piece 28 is provided with a central, threaded hole, through which passes the threaded-rod of the locking-screw 29, the head of which is tapered on its under-side, to fit the tapered opening in the valve-seat 30. The head of the locking-screw 29 is slotted on its upper-side, so as to provide means for opening and closing the valve, by using a screw driver or other suitable tool. In Fig. 5 the valve is shown opened, as is the case when the water supply is not under pressure.

In Fig. 1 the water in the tank is shown partly withdrawn, and the vent-hole 24 is shown open and the inlet-pipe cock 18 closed. The outlet-pipe 20 may, if desired, be a straight pipe located near the base-plate 3 of the tank.

In operation the tank is filled with water and the burners 6 lighted. The gas burners at the same time that they are being used for cooking or other purposes heat the sides 15 of the burner-holders 5, thereby heating the burner-holders 5, from which the heat is conveyed to the entire tank, and hence to the water in the tank.

By placing the inlet-pipe 17 and the outlet-pipe 19 in diametrically opposite corners of the tank the circulation of hot water within the tank is facilitated, when the inlet-pipe cock 18 is opened to admit cold water to the tank and the faucet-cock 20 is at the same time opened to draw hot water.

It is to be understood that my invention is not limited to the specific details of construction shown in the accompanying drawings, but that the said details may be varied in the practical carrying out of my invention. It is also to be understood that the combinations specifically set forth in the several claims are intended to be separately claimed without limitation to the use in connection therewith of other features and details of construction illustrated.

I claim as new and desire to secure by Letters Patent:

1. In a combined gas stove and water heater, the combination with a water receptacle, of a plurality of cylindrical burner-holder receptacles extending down into the water receptacle, cylindrical gas burners provided with a plurality of gas-jet holes on the upper surface and sides, the outer sides of each cylindrical gas burner being in proximity to the wall of its burner-holder receptacle, a cooking plate for each burner, the said gas-jet holes being adapted to direct gas flames simultaneously against the walls of the burner-holder receptacles and cooking-plates above the said burners and being adapted also to distribute uniformly heat directly applied from contact with the gas flames, over the entire surface of the walls of the said burner-holder receptacles.

2. In a combined gas stove and water heater, the combination with a water receptacle, of a plurality of cylindrical tubular gas burners provided with a plurality of gas-jet holes on the upper surface and sides and provided also with a plurality of draining grooves in the base of each burner extending from the center portion thereof, cooking-plates, burner-holder receptacles extending down into the water receptacle, the outer wall of each gas burner and its burner-holder receptacle being placed near each other, the said gas-jet holes on the sides being adapted to direct gas flames against the walls of the said burner-holder receptacles for heating the water before the flame passes upward to the cooking-plates, and a drain pipe extending from the base plate of each burner-holder receptacle and leading to the outer wall of the receptacle provided with a lip at its extremity.

In testimony whereof I affix my signature in presence of two witnesses.

JACOB I. ORKIN.

Witnesses:
CHARLES F. A. SMITH,
FRANKLIN S. FRISBIE.